Aug. 15, 1950  W. V. BELL  2,518,593
BAIT-FISH HOLDER
Filed April 25, 1947
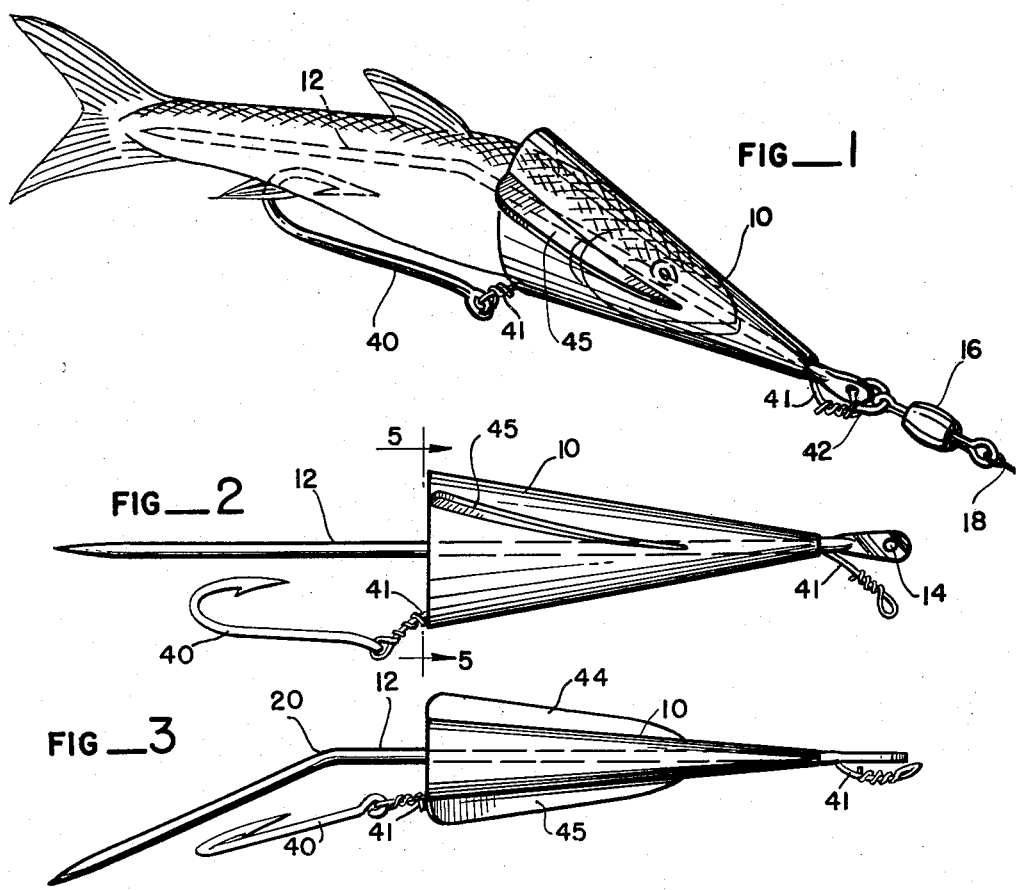
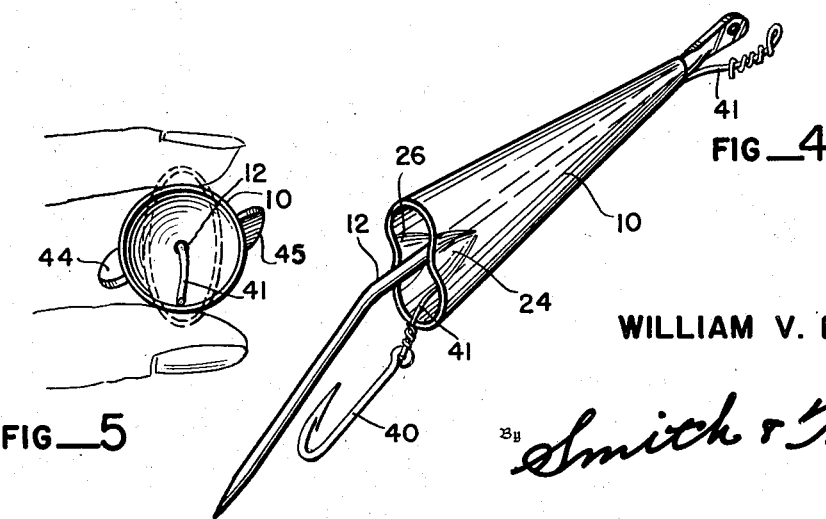
WILLIAM V. BELL
Inventor
By Smith & Tuck
Attorneys Patented Aug. 15, 1950

2,518,593

UNITED STATES PATENT OFFICE 2,518,593

BAIT-FISH HOLDER

William V. Bell, Seattle, Wash.

Application April 25, 1947, Serial No. 743,861

4 Claims. (Cl. 43—44.2)

My present invention relates to the art of fishing lures, and more particularly, to a bait-fish holder.

Despite the large number of artificial lures, such as plugs, spoons, and combinations of the same, which have been created for the taking of the larger fish, there are many conditions under which the use of fresh fish of the kind commonly supplying the normal food for the fish sought is by all means the most effective lure that can be used.

In the past, one objection to using the natural food fish as a lure has been the difficulty of presenting the fish in a life-like manner and also to maintain it in a life-like manner. Too often, where the fish is merely applied to the hook, it soon becomes distorted or displaced, and assumes a most unnatural appearance, so that it no longer serves effectively as a lure. It is to overcome these general objections to the use of fresh fish as lures that I have provided my fresh fish holder.

The principal object of my present invention, therefore, is to provide a convenient means for holding a fresh fish lure in a natural position.

A further object of my device is to provide means whereby a fresh fish lure may be used for relatively long periods until it has been actually attacked and taken by the game fish sought.

A further object of my invention is to provide means whereby the fish lure may be formed as to shape and held in that position during the usual fishing life of the same.

Another object of my invention is to provide means that will securely engage the head portion of a fresh fish when used as a lure and will prevent the entrance of water into the mouth of the fish so that it will not become bloated or distorted in use.

Further objects, advantages and capabilities will be apparent from the description and disclosure in the drawings, or may be comprehended or are inherent in the device. In the drawings:

Fig. 1 is a perspective view showing my bait holder as attached to a fresh bait, with the various parts shown in the arrangement preferred for fishing the lure.

Fig. 2 is a side elevational view of my bait holder.

Fig. 3 is a top plan view of Fig. 2.

Fig. 4 is a perspective view showing my bait holder by itself without attachments, and illustrating one form of the securing means used to hold the bait fish in the protective shield.

Fig. 5 is a sectional view taken along line 5—5 of Fig. 2 showing in dotted lines the distortion of my shield member during the insertion of the bait-fish.

Referring more particularly to the disclosure in the drawings, the numeral 10 designates the shield forming the principal portion of my lure-fish holder. This I prefer to make generally in a conical shape and of transparent material. Further, I prefer to use a transparent material that is somewhat flexible so that this flexibility of the material may be used to facilitate secure engagement of the fish.

Referring to Figs. 2 and 4, it will be observed that in side elevation shield 10 is flared very appreciably, as contrasted with the showing of Fig. 3, which is a top plan view. This general shape is probably best illustrated in Fig. 4, where it will be noted that the horizontal axis of the open end of the shield is much less than the vertical axis.

Shield 10 is fixedly secured to the impaling pin 12 at its head or leading end by making the opening therein slightly smaller than the diameter of pin 12 which causes a binding action and to insure this lock, a small amount of waterproof glue is used on the contacting surfaces. An extension of this pin is provided with an eyelet at 14, which provides the means for attaching, usually a swivel 15, and then the towing or fishing line or leader 18 may be attached.

As viewed from the top, it is to be noted that the impaling pin 12 is deformed by the relatively sharp bend as shown in Fig. 3 at 20. This form of pin running through the flesh of the herring gives the herring, or other bait fish used, a definite bend in the horizontal plane. This gives the fish an angular set which acts as do many of the artificial plugs, in that it creates a wobbling or darting action in the bait fish. This action creates the impression of an injured fish, which is the most sought after of all baits in that the fish attacking expects to make a kill with the least effort.

In Fig. 4, it will be noted that the shell of the shield in the horizontal axis is provided with two inwardly directed deformed portions as 24 and 26. These indentations normally are so positioned as to engage the bait fish in the area immediately behind the gills, so that the bait fish is held quite securely within the cone-like shield 10.

To further co-act with my shield 10, I have provided as my preferred form of my hook attachment the fish hook 40, which is secured by flexible means 41 to the towing line as indicated in Fig. 1 by the ring 42. A very satisfactory adjustment of the length of connector 41 is to provide it of sufficient length so that the barb end of hook 40 may be entered in the anus of the fish. This adjustment, once made, will usually serve for an extended period, as the bait fish used at any one time are normally from runs of fish that are substantially of the same size. Normally I prefer that connector 41 run inside of shield 10.

In order to impart a life-like action to my lure, I provide, in my preferred form, opposed spirally positioned ribs or fins 44 and 45, as illustrated in Figures 1, 2, 3 and 5.

In using my lure, the first operation normally is to thread the bait fish onto the impaling hook 12, until its nose begins to enter shield 10. At this point, shield 10 is compressed on its major axis in cross-section after the showing of Fig. 5, and then the head of the bait fish is entered as fully as it can be, without distortion. Pressure is then released and the securing means which may be of a form shown in Fig. 4 is then engaged with the fish to hold it in place. The next operation is to engage hook 40, as indicated, into the body of the fish, or even into the flesh of the fish, in some instances. Owing to the bend in pin 12, after the showing of Fig. 3, the fish will then form a bent bait, as though it might be a fish that has been struck by another fish and has escaped. This bend will cause the fish to perform various gyrations as it is passed through the water, and this has been found to be very effective.

It is believed that it will be clearly apparent from the above description and the disclosure in the drawings that the invention comprehends a novel construction of a bait-fish holder.

Having thus described my invention, I claim:

1. In a bait-fish holding device, the combination of a resilient thin-walled transparent shield having a height of greater extent than its width, an impaling pin having a body of uniform cross section for a substantial portion of its length and sharpened at its rear end, and flat and perforated at its forward end to provide a line attaching means, means for attaching said shield to said impaling pin, said impaling pin being provided with a bend at the rear of the shield and intermediate the ends of the pin, said shield having portions thereof constricted and adapted to engage the bait-fish at the rear of its gill area, a fishing hook, and a flexible connector secured to the line attaching means in front of said shield and connected to said fishing hook.

2. In a bait-fish holding device, the combination of a resilient thin-walled transparent shield having a height of greater extent than its width, an impaling pin having a body of uniform cross section for a substantial portion of its length and sharpened at its rear end, and its forward end providing line attaching means, means for attaching said shield to said impaling pin, said impaling pin being provided with a bend at the rear of the shield and intermediate the ends of the pin, said shield having means formed therein adapted to engage the bait-fish at the rear of its gill area, a fishing hook, flexible means secured to the line attaching means and connected to said fishing hook, and two curved fins attached to the opposite sides of said shield.

3. In a bait-fish holding device, the combination of a resilient thin-walled transparent shield having a height of greater extent than its width, an impaling pin having a body of uniform cross section for a substantial portion of its length and sharpened at its rear end, and flat at its forward end to provide a line attaching means, means for attaching said shield to said impaling pin, said impaling pin being provided with an angular bend at the rear of the shield and intermediate the ends of the pin, a fishing hook, and flexible means secured to the flat end of said impaling pin forwardly of said shield and connected to said fishing hook.

4. In a bait-fish holding device, the combination of a resilient thin-walled transparent shield having a height of greater extent than its width, said shield having opposed deformed inwardly directed rear portions adapted to engage the bait-fish at the rear of its gill area, an impaling pin having a body of uniform cross section for a substantial portion of its length, sharpened at its rear end and provided at its forward end with line attaching means, means for attaching said shield to said impaling pin, said impaling pin being provided with a bend at the rear of the shield and intermediate the ends of the pin, a fishing hook, and means for attaching said fishing hook to said line attaching means.

WILLIAM V. BELL.

REFERENCES CITED

The following references are of record in the file of this patent:

UNITED STATES PATENTS

| Number | Name | Date |
|---|---|---|
| 573,572 | Dales | Dec. 22, 1896 |
| 1,814,450 | Nelson | July 14, 1931 |
| 2,238,900 | Hadaway | Apr. 22, 1941 |
| 2,359,410 | Edwards | Oct. 3, 1944 |
| 2,461,755 | Miller | Feb. 15, 1949 |

FOREIGN PATENTS

| Number | Country | Date |
|---|---|---|
| 886,776 | France | July 12, 1943 |
| 43,454 | Sweden | Mar. 17, 1917 |
| 11,135 | Great Britain | of 1891 |